US 7,644,281 B2

(12) United States Patent
Deguillaume et al.

(10) Patent No.: US 7,644,281 B2
(45) Date of Patent: Jan. 5, 2010

(54) CHARACTER AND VECTOR GRAPHICS WATERMARK FOR STRUCTURED ELECTRONIC DOCUMENTS SECURITY

(75) Inventors: Frédéric Deguillaume, Geneva (CH); Sviatoslav Voloshynovskiy, Geneva (CH); Thierry Pun, Geneva (CH)

(73) Assignee: Universite de Geneve, Geneva (CH)

( * ) Notice: Subject to any disclaimer, the term of this patent is extended or adjusted under 35 U.S.C. 154(b) by 873 days.

(21) Appl. No.: 10/949,318

(22) Filed: Sep. 27, 2004

(65) Prior Publication Data
US 2006/0075241 A1    Apr. 6, 2006

(51) Int. Cl.
*H04L 9/32* (2006.01)

(52) U.S. Cl. .................................... 713/176
(58) Field of Classification Search ........................ None
See application file for complete search history.

(56) References Cited

U.S. PATENT DOCUMENTS

| | | | |
|---|---|---|---|
| 5,629,770 | A | 5/1997 | Brassil et al. |
| 5,765,176 | A * | 6/1998 | Bloomberg ............... 715/209 |
| 5,841,886 | A | 11/1998 | Rhoads |
| 6,086,706 | A | 7/2000 | Brassil et al. |
| 6,104,812 | A | 8/2000 | Koltai et al. |
| 6,456,393 | B1 | 9/2002 | Bhattacharjya et al. |
| 6,782,509 | B1 * | 8/2004 | Hirayama et al. ........... 715/210 |
| 6,904,151 | B2 | 6/2005 | Deguillaume et al. |
| 6,912,294 | B2 * | 6/2005 | Wang et al. ............... 382/100 |

(Continued)

FOREIGN PATENT DOCUMENTS

EP              0 629 972 A2    12/1994

(Continued)

OTHER PUBLICATIONS

A. M. Eskicioglu and E. J. Delp, "An overview of multimedia content protection in consumer electronic devices", Signal Processing: Image Communication, vol. 16, pp. 681-699, 2001.

(Continued)

*Primary Examiner*—Pramila Parthasarathy
(74) *Attorney, Agent, or Firm*—Patterson, Thuente, Skaar & Christensen, P.A.

(57) ABSTRACT

The present invention is a method and apparatus for watermarking text or vector graphics documents. It is based on character-wise or vector graphics element-wise grayscale or color modulation. At high resolution, halftone or dither modulation can also be used in addition or in place of grayscale/color modulation, for printed representation of electronic document. For the detection, the document is acquired through an acquisition device, document segmentation is performed, characters/elements are segmented, the watermark signal is estimated and the information is decoded. Although the proposed scheme mostly addresses the watermarking of hard-copy documents, it can easily be integrated into electronic document editing and acquisition tools, and the watermark is attached to the document electronic version.

The invention is applicable either using expensive high-resolution printing and acquisition devices, either using common cheap low-resolution devices, depending on the application needs. The proposed scheme is suitable for example to the protection of security documents, contracts, technical and commercial documentation; it can use any physical support like paper, cellulose, or plastic; it can be used for copy protection, authentication, or tamper proofing; finally it can also be applied to other non security-related applications, such as document tracking, as well as document embedded annotation and watermarked-assisted automatic processing.

23 Claims, 4 Drawing Sheets

U.S. PATENT DOCUMENTS

| | | | |
|---|---|---|---|
| 7,305,104 B2 * | 12/2007 | Carr et al. | 382/100 |
| 2002/0118860 A1 | 8/2002 | Pasqua | |
| 2002/0157005 A1 * | 10/2002 | Brunk et al. | 713/176 |
| 2003/0070075 A1 | 4/2003 | Deguillaume et al. | |
| 2004/0013285 A1 | 1/2004 | Jordan et al. | |
| 2005/0271246 A1 * | 12/2005 | Sharma et al. | 382/100 |

FOREIGN PATENT DOCUMENTS

| | | |
|---|---|---|
| GB | 2 344 666 A | 6/2000 |
| WO | WO 00/04501 | 1/2000 |
| WO | WO 02/102055 A1 | 12/2002 |
| WO | WO 03/032254 A1 | 4/2003 |

OTHER PUBLICATIONS

M. Kutter, Watermarking resistent to translation, rotation and scaling, in Proc. SPIE Int. Symp. On voice, Video, and Data Communication, Nov. 1998.

C. I. Podilchuk and E. J. Delp, "Digital watermarking: Algorithms and applications", IEEE Signal Processing Magazine, vol. 18, No. 4, pp. 33-46, Jul. 2001.

J. J. K. Ruanaidh and T. Pun, "Rotation, Scale and Translation Invariant Spread Spectrum Digital Image Watermarking", Signal Processing, vol. 66 num. 3, pp. 303-317, 1998.

R.W. Wolfgang, C. I, Podilchuk and E. J, Delp, "Perceptual watermarks for digital images and video", Proceedings of the IEEE, vol. 87, No. 7, pp. 1108-1126, Jul. 1999.

J. Fridrich, "A Hybrid Watermark for Tamper Detection in Digital Images", Proceedings of ISSPA 1999 Conference, pp. 301-304, Aug. 1999, Brisbane, Australia.

P. W. Wong, "A Public Key Watermark for Image Verification and Authentication", Proceedings of the IEEE International Conference on Image Processing (ICIP) 1998, vol. I, MA11.07, Oct. 1998, Chicago, Ill., USA.

M. Wu and B. Liu, "Watermarking for image authentication", Proceedings of IEEE International Conference on Image Processing (ICIP) 1998, TA10.11, Focus Interactive Technology Inc., Oct. 1998, Chicago, Ill., USA.

Z. Z. Baharav and D. Shaked, "Watermarking of dither halftoned images", Proceedings of the IS&T/SPIE International Conference on Security and Watermarking of Multimedia Content I, vol. 3657, pp. 307-316, Jan. 1999, San Jose, Calif., USA.

M. S. Fu and O. C. Au, "Data hiding watermarking for halftone images", IEEE Transactions on Image Processing, vol. 11, No. 4, pp. 477-484, Apr. 2002.

S. Voloshynovskiy, F. Deguillaume and T. Pun, "Content adaptive watermarking based on a stochastic multiresolution image modeling", Proceedings of the Tenth European Signal Processing Conference (EUSIPCO) 2000, Sep. 2000, Tampere, Finland.

F. Deguillaume, S. Voloshynovskiy and T. Pun, "Method for the estimation and recovering of general affine transforms in digital watermarking applications", Proceedings of the IS&T/SPIE International Conference on Security and Watermarking of Multimedia Content IV, vol. 4675, pp. 313-322, Apr. 2002.

S. Voloshynovskiy, F. Deguillaume and T. Pun, "Multibit Digital Watermarking Robust Against Local Nonlinear Geometrical Distortions", Proceedings of the IEEE International Conference on Image Processing, pp. 999-1002, Oct. 2001, Thessaloniki, Greece.

F. Deguillaume, S. Voloshynovskiy and T. Pun, "Secure Hybrid Robust Watermarking Resistant against Tampering and Copy Attack" IEEE Signal Processing, vol. 83, No. 10, pp. 2133-2170, Oct. 2003.

A. K. Bhattacharjya and H. Ancin, "Data embedding in text for copier systems", IEEE International Conference on Image Processing (ICIP), Oct. 1999, Kobe, Japan.

A. M. Alattar and O. M. Alattar, "Watermarking electronic text documents containing margin justified paragraph and irregular line spacing", Proceedings of the IS&T/SPIE International Conference on Security, Steganography, and Watermarking of Multimedia Contents VI, vol. 5306, pp. 685-695, Jan. 2004, San Jose, Calif., USA.

J. T. Brassil, S. Low and N. F. Maxemchuk, "Copyright protection for electronic distribution of text documents", Proceedings of the IEEE, vol. 87, No. 7, pp. 1181-1196, Jul. 1999.

J. T. Brassil, S. Low, N. F. Maxemchuk and L. O'Gorman, "Electronic marking and identification techniques to discourage document copying", IEEE Journal on Selected Areas in Communication, vol. 13, No. 8, pp. 1495-1504, Oct. 1995.

S. Low and N. F. Maxemchuk, "Capacity of text marking channel", IEEE Signal Processing Letters, vol. 7, No. 12, pp. 345-347, Dec. 2000.

D. Huang and H. Yan, "Interword distance changes represented by sine waves for watermarking text images", IEEE Transactions on Circuits and Systems for Video Technology, vol. 11, No. 12, pp. 1237-1245, Dec. 2001.

Y.-W. Kim, K.-A. Moon and I.-S. Oh, "A Text Watermarking Algorithm based on Word Classification and Inter-word, Space Statistics", Seventh International Conference on Document Analysis and Recognition, vol. II, pp. 775-779, Aug. 2003, Edinburgh, Scotland.

M. Atallah, V. Raskin, C. F. Hempelmann, M. Karahan, R. Sion, U. Topkara, K. E. Triezenberg, "Natural Language Watermarking and Tamperproofing", Fifth Information Hiding Workshop (IHW 2002), LNCS 2578, Springer Verlag, Oct. 2002, Noordwijkerhout, The Netherlands.

A. K. Mikkilineni, G. N. Ali, P.-J. Chiang, G. T. C. Chiu, J. P. Allebach and E. J. Delp, "Signature-embedding in printed documents for security and forensic applications", Proceedings of the IS&T/SPIE International Conference on Security, Steganography, and Watermarking of Multimedia Contents VI, vol. 5306, pp. 455-466, Jan. 2004, San Jose, Calif., USA. [0097].

S. I. Gel'fand and M. S. Pinsker, "Coding for channel with random parameters", Problems of Control and Information Theory, vol. 9, No. 1, p. 19.

D. Coppersmith, F. Mintzer, C. Tresser, C. W. Wu and M. M. Yeung, "Fragile imperceptible digital watermark with privacy control", IS&T/SPIE Electronic Imaging '99, Session: Security and Watermarking of Multimedia Contents, Jan. 1999, San Jose, Calif., USA.

Y. Liu, J. Manton, E. Wong and S. Low, "Marking and detection of text documents using transform-domain techniques", Proceedings of IS&T/SPIE Conference on Security and Watermarking of Multimedia Contents, vol. 3657, pp. 317-328, Jan. 1999, San Jose, Calif., USA.

* cited by examiner

CHARACTER AND VECTOR GRAPHICS WATERMARK FOR STRUCTURED ELECTRONIC DOCUMENTS SECURITY

BACKGROUND OF THE INVENTION

Protecting sensitive or valuable information has always been a key requirement of modern civilizations. The rapidly growing multimedia market and use of digital technologies, networks and computers recently revealed unprecedented security threats leading to an urgent need for securing documents. Among the major security issues initially pointed out, the most important are: the ease with which exact copies of digital content can be made without authorization; the effectiveness with which high quality counterfeits can be made with usual document editing tools; and the ease with which the true originator or owner of a document can be faked for fraudulent purpose. However, despite the general diffusion of modern technologies and multimedia, textual content and hardcopy documents still remain the most common, habitual and widely used information carrier in many everyday scenarios. Moreover, while similar security issues exist for textual or printed documents as for electronic media, counterfeiters and criminal individuals or organizations benefit from the progress in digital imaging technologies, as well as from the non-technical expertise of different consumers or actors of the society. Then digital watermarking has been considered in the years 1990 as a possible approach able to address the above problems, first mostly tackling the case of digital multimedia content such as sound, images and video, and targeting copyright protection, authentication and integrity control.

Digital Watermarking of Visual Content

Numerous digital watermarking techniques have been developed for electronic row or bitmap visual content (mostly still images, but also video), which process such content as continuous-tone grayscale or color visual information. These schemes mostly target copyright protection applications [1] [2] [3] [4] [5], as well as tamper proofing and authentication with localization capabilities [6] [7] [8] [9]. Other approaches specifically address printed media, usually by interacting with the image halftoning process used by most common printers and called halftone or dither modulation [10] [11]. A highly robust multi-resolution self-reference watermarking scheme for images has been designed [12], which includes recovery from linear [13] and non-linear [14] geometrical distortions, and image authentication and tamper proofing with localization [15]; this technology is also covered by several patents [16] [17] [18].

Text Document Watermarking

However, protecting physical documents containing textual information has clearly become an issue of high importance, since printed material has been proven to be a direct accessory to many criminal and terrorist acts; some examples of such documents are identity authentication and transaction documents, which today are easy to forge or to tamper using modern technologies. Visual content watermarking schemes mentioned above can resist to printing and rescanning, but at the price of very low data-hiding embedding rate. Such watermarks also result into a significant visual quality degradation of protected material in the case of computer-generated "artificial" images, which comprise synthetic images, flowcharts and industrial drawing, and also text and more generally vector graphics.

Row Image Document Watermarking

Early proposal for text document watermarking was to use one of the row visual watermarking schemes above, and to apply it on a document converted to a high-resolution image in order to overcome the cited visual quality problem [3] [5]. In this context we can mention the work of Bhattacharjya and Ancin [19] [20] where selected pixels are modified in text and characters areas in order to hide the information; Rhoads patent proposes to embed a watermark in pictures elements of a document [21], and Koltai patent modifies the printed dither patterns that can be observed with magnifying lens in order to encode the message [22]. However the use of high resolution leads to the necessity to handle large amounts of data, requiring more computation and memory as well as high quality printers and scanners, conditions which may be costly and thus difficult to achieve in real world applications.

Hard-Copy Robust Text-Based Document Watermarking

Therefore approaches which are more text specific than pixel-wise or point-wise modulation have been developed, which hide information by changing characteristics surviving through the printing/rescanning process. One popular class of techniques works by slightly modifying position or geometry related features of printed characters, lines or text, without altering the content of the text itself. These characteristics can be: relative positions or sizes of characters or lines; character fonts; spacing between characters, lines, or words; or margin alignment [23] [24] [25] [26] [27] [28] [29] [30]. For example, Alattar and Alattar use words/lines spacing modulation [23]; Brassil et al use positions shifting of groups of words or lines for coding [24] [25] [26] [27]. We can mention also Huang and Yan work, which represents hidden information as sine waves in the average inter-word distance [31]. Techniques like spread spectrum and error correcting codes are often used to achieve some robustness against document reformatting. Kim et al [32] try to achieve robustness by classifying words relatively to some features, grouping adjacent words into segments which are also classified, and encoding the information by modifying some statistics of inter-word spaces within these segments. A second major class of text watermarking schemes consists of semantic-based watermarking which modifies the content of the text itself, by replacing words or sentence by semantic equivalents or synonyms. Purdue university team developed a scheme which embeds information in the syntax or grammatical structure of natural language [33].

Concerning these two classes of techniques, we can remark that position/geometric based techniques are not always suitable for generation in common document editing tools. There are intrinsically sensitive to document reformatting (especially in electronic version before printing), or to rescanning and rearranging/retyping. Redundancy-based techniques like error correcting codes (ECC) or spread-spectrum methods are used to achieve some robustness against these kinds of attacks. In contrary, text substitution techniques like the approach [33] are robust against reformatting, but they are language-dependent, need natural sentence processing and large dictionaries, and are not acceptable in many scenarios where the exact document content should be preserved. Finally, most of text watermarking schemes can achieve low data-hiding rates with one bit per word, per line, or per sentence only.

Soft-Copy Document Watermarking

Soft-copy watermarking schemes work by modulating features in an electronically encoded document, but which are neither displayed nor printed. This can consist in inserting characters with the same color as the background, extra space and back-spaces, or any other invisible attributes or even additional text but tagged to be invisible. Examples of soft text document watermarking are given by Carro [34] and Turner and Manikas [35] patents. We can also mention the patent of Hirayama et al [36] which proposes to modify features like pitch between designated characters of electronic documents.

Although high data-hiding rates can be achieved (since an arbitrary amount of invisible features can in principle be added within the electronic format), this approach is format specific, is usually not robust to format conversion, and thus is not applicable for printed documents. This approach is very similar to the invisible Internet "bugs", which are sometimes hidden in web pages for advertisement purpose and user surfing habits tracking. This approach can be assimilated to adding headers to electronic documents, which do not survive digital to analog conversion.

Other Techniques for Printed Document Protection

In this review of existing document watermarking schemes we can still mention more sophisticated techniques, like Mikkilineni et al's work [37] which hides extrinsic information by interacting with the physical printing process, and use the printer-dependant physical defects as an intrinsic signature, principally for forensic purpose. Noticing the fact that text document, as images, are essentially dual-tone and present high frequency components, Liu et al [38] explore the combination of spatial domain watermarking (shifting word, lines, etc.) with frequency domain detection: the document needs conversion into a high-resolution image but at the decoder side only. Finally, a last but not the least method is described in the patent of Jordan, Meylan and Kutter [39], hiding information in a printed document by placing sparse and imperceptible tiny dots on the sheet or paper based on a key-dependent pseudo-random spatial disposition. The watermark, which actually consists in a set of points, is not embedded into the original electronic version of the document, and is typically added in a second pass to an already printed copy. This approach possesses a good compromise between data-hiding rate and robustness. However, the necessity to perform two times passing considerably constrains its practical usability; the creation of a "sparse barcode" image can be hardly incorporated and stored directly in document editing tools.

BRIEF SUMMARY OF THE INVENTION

The invention described in the current document is a method and apparatus for watermarking text or vector graphics documents, in both electronic format and printed version. In this proposal, the watermark is embedded before printing by modulating one or several printable attributes of a complete character or vector graphics element, or of a group of characters or of such elements. Modulated attributes are one or several from character luminance (or grayscale) and/or color values that can be represented by corresponding halftone patterns, or corresponding variation of character luminance reproduced by laser engraving. The embedded watermark is attached to the document in its electronic format before printing, and the watermark generator can be embedded in the text editing tool directly. Since the scheme is a character-based or vector element-based watermark with possibly more than 1 bit per character or element, it can achieve a reasonable data-hiding rate for many needs for most of text or vector graphics documents.

Therefore the major advantages of the proposed invention can be summarized as follows:

1) For textual documents, the watermark is contained in the text and "follows" it in any form of its representation, including digital-to-analog conversion such as printing or conversion through multiple electronic formats that potentially even include lossy compression.
2) The proposed method can achieve a very high data-hiding rate, up to 4 or 6 bits per character (or even more) if the proper printing/engraving method is used.
3) Instead of distributing the watermark as dots over the document in a sparse way like in Jordan et al patent [39] or in Rhoads patent [21] which interprets data at the pixel-wise level, thus resulting into a problem of visibility in the white background, we oppositely concentrate the watermark in each character to be printed: this approach does not require any special document manipulations beside those applied to the characters, which could lead to quality degradation.
4) Watermark synchronization during the decoding stage can be done using the natural properties of structured text with parallel lines reflected in the special orientation of text Fourier transform spectrum magnitude. Moreover, this method is inherently robust to resealing, change of aspect-ratio and even non-uniform stretching since the watermark decoding follows the text lines.
5) Finally, the method requires only common quality ink-jet/laser printers or corresponding analog devices, as well as scanners at standard resolutions, providing a cheap and convenient solution for many practical situations. However, more expensive devices can also be used for more specific applications, such as laser engraving for example.

The present invention principally targets printed document security, although the proposed watermark embedding/extraction technique is also suitable for electronic documents as well as for non security-related applications. The invention can be applied to (but is not limited to) the following applications: copy protection, ownership or rights protection, authentication, integrity control, personal identification, anti-counterfeiting, tracking, tracing, or quality control. Targeted documents can be authentication documents (passports, visas, identity (ID) cards, driving licenses), payment documents (credit cards, banknotes or checks), travel documents (train or flight tickets), certificates (diplomas, attestations, financial transactions), letters, information on letter envelopes, contracts, technical reports, labels and packaging. The hidden information can be document-dependent or document-independent, use symmetric or asymmetric cryptographic protocol, or be integrated into corresponding protocol depending on the targeted application.

One embodiment of the present invention includes a method for embedding a digital watermark w into textual or vector graphics documents, addressing both electronic and hard-copy documents, based on the modulation of the luminance (or grayscale) values, of the color values, or of corresponding halftone patterns, of characters or of vector elements, comprising the steps of:

(a) Possibly encrypting a digital message m depending on an encryption key $k_{enc}$ and/or encoding it possibly depending on an auxiliary key $k_{aux}$, resulting into a codeword c; spatially allocating c, possibly depending on $k_{aux}$, and possibly with interleaving of a pilot sequence also depending on $k_{aux}$, resulting into a watermark signal w suitable for text or vector graphics modulation.

(b) Parsing the original input (or cover) document in electronic format x in order to isolate all its components such as: text, vector graphics, raw or bitmap images, attributes, etc.

(c) Selecting text or vector graphics components $x_{text}$ which will carry the watermark parsing components $x_{text}$ in order to select single entities or elements, to use to encode individual w symbols; and keeping the remaining non selected components $x_{non-text}$ for later document recomposition.

(d) Modulating the grayscale attributes, the color attributes or the halftone patterns of the selected elements in the selected text or vector graphics components $x_{text}$.

(e) Recomposing the document from the marked version of selected components $x_{text}$ and the remaining components $x_{non-text}$, resulting into the watermarked (or stego) document y, which can be stored, distributed, or used in electronic form as $\check{y}_a$.

(f) Possibly printing the stego document v to a hard-copy version which can be stored, distributed, or used as $\check{y}_b$, using printing hardware and apparatus capable to preserve the modulated attributes above (that is: grayscale values, color values, or halftone patterns).

In another embodiment of the present invention, the method may also include wherein the watermarked hard-copy and possibly distorted or attacked document $\check{y}'_b$ is acquired as y', prefiltered, segmented, processed and from which the watermark is extracted as $\hat{w}$, the codeword $\hat{c}$ is estimated, and the message $\hat{m}$ is decoded, comprising the steps of:

(a) Acquiring the printed document $\check{y}'_b$ using an acquisition device (typically a scanner) resulting into the document raw image y'.

(b) Prefiltering this image y' for better processing accuracy for the following steps.

(c) Applying document segmentation on the prefiltered raw image, including the selection of documents components (pages, textual/vector graphics areas or non-textual/vectorial areas, paragraphs, continuous-tone images, etc.).

(d) Extracting the possibly modulated elements from the textual or vector graphics components, in particular performing character segmentation in the case textual documents.

(e) Estimating the watermark sequence or signal $\hat{w}$ from the modulated attributes which are grayscale, color values and/or halftone patterns, possibly depending on the auxiliary $k_{aux}$.

(f) Generating the pilot signal from $k_{aux}$; estimating and compensating $\hat{w}$ state and desynchronization, based on the pilot signal and possibly other criterions, and possibly depending on $k_{aux}$, resulting into the estimated codeword $\hat{c}$; decoding $\hat{c}$, possibly depending on $k_{aux}$; and possibly decrypting it into the final message as $\hat{m}$ depending on the decryption key $k_{dec}$.

BRIEF DESCRIPTION OF THE DRAWINGS

The drawings shown in:

FIG. 1: An embodiment for the proposed algorithm addressing the watermarking of electronic documents including textual or vector graphics data. The message m is possibly encrypted (block 1) depending on the encryption key $k_{enc}$, then encoded (2) for error correction resulting into the codeword c. A pilot signal is generated (3) from an auxiliary key $k_{aux}$ as a reference for watermark resynchronization at the extraction/decoding stage. The codeword c and the pilot are spatially allocated (4) resulting into the watermark w. The auxiliary key $k_{aux}$ may be necessary also for the encoder (2) and the spatial allocation (4). The source (cover) electronic document x is parsed (5) in order to isolate its text (or vector graphics) components $x_{text}$, and non-text (non-vector graphics) components $x_{non-text}$; components $x_{text}$ are selected (6) for text characters (or vector graphics elements) modulation (7) in order to insert w, based on grayscale/color values or halftone patterns alteration, resulting into the modulated text (or vector graphics) $y_{text}$. Then all document components are used to recompose a document (8) equivalent to the original one but containing the watermark, resulting into the watermarked (stego) document y, which can be either printed (9b) as the hard-copy $\check{y}_b$, or stored in electronic form (9a) as $\check{y}_a$. The invention mainly consists of blocks in bold (5), (6), (7) and (8).

DESCRIPTION OF THE INVENTION

This invention proposes a novel character (letter, symbol, etc.) and vector graphics watermarking algorithm, which can be applied to documents, either in electronic form, or in printed, engraved, or hard-copy form. The watermark is embedded in an imperceptible manner in the characters of the textual parts of the document, or in the vector graphics it contains. Text/vector graphics watermarking can be used for example for: document annotation, copy tracking, document and/or person authentication, document authentication and tamper proofing, or product anti-counterfeiting including luxury goods, pharmaceutical and perfumeries. The main advantage of text/vector graphics watermarking is its capability to hide information inside the textual or vector graphics data itself, regardless from the document format, appearance or presentation thus providing text/vector graphics watermarking of security documents or of products needing to be protected.

The proposed watermarking algorithm is based on the modification of text attributes represented by character luminance or intensity of display, color values, or corresponding halftone patterns automatically reproduced from the above values during the printing process at the level of a whole character or vector graphics element, or known part of it considering it as separate objects with defined shapes, sizes and orientations, instead of modifying standalone pixels, and using the Gel'fand-Pinsker random binning principle for data embedding [40]. Targeted applications mainly consist of the watermarking of printed documents, using common and cheap laser or inkjet printers or special engraving devices, and usual scanners. The principal novelty of the described approach below resides in the luminance/color modulation of characters/vector graphics in an unperceived way, directly in the text editing tool and storage of the watermarked document, either in the same format or converted into any appropriate currently existing or future text/vector graphics storage format (.pdf, .ps, .html/.xml, etc.).

Due to our knowledge, luminance/color text/vector graphics character-object based modulation has no equivalent in the state-of-the-art of text data-hiding. This approach is detailed below for the case of text watermarking, including the embedding process and the extraction process. Its application to vector graphics relies on similar principles.

Luminance/Color Modulation-Based Document Watermarking

Figure 1:
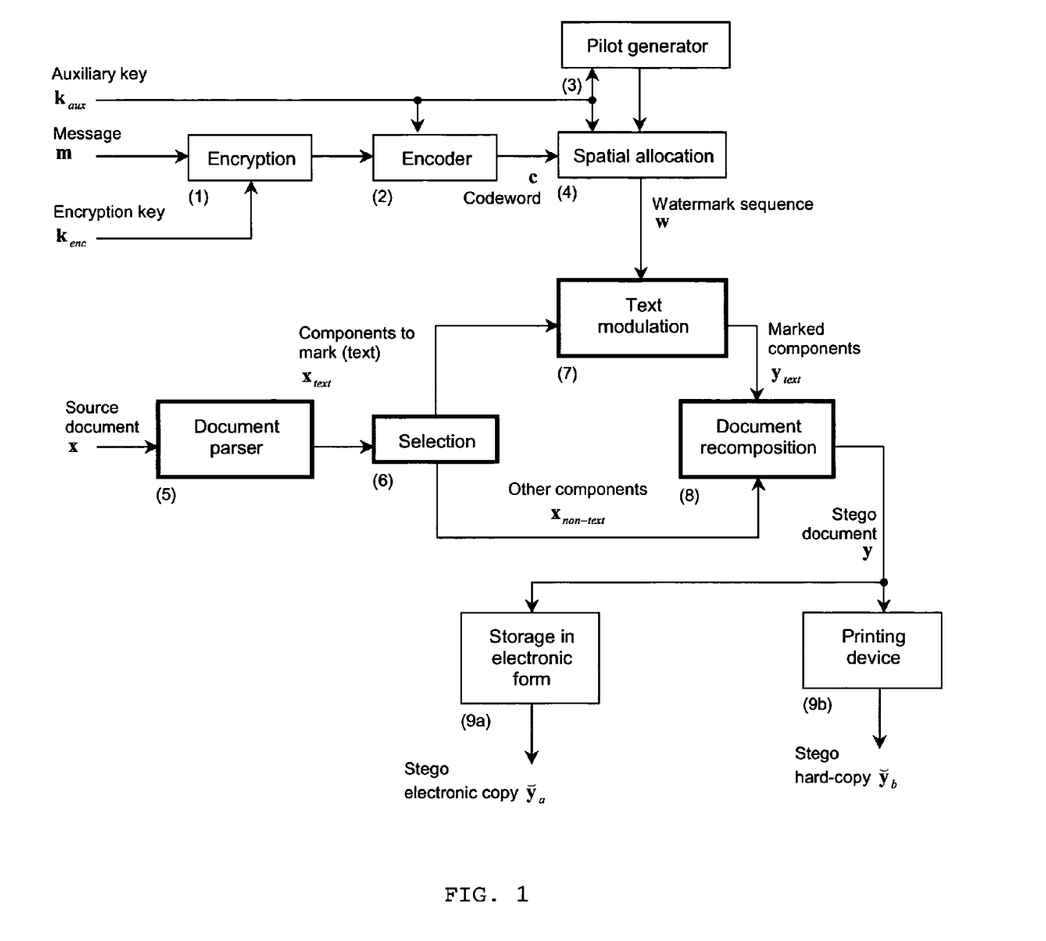

The text watermarking embedding process is described in the block-diagram of FIG. 1. The main contribution of this invention is shown by the blocks in bold (5-8). The idea is to hide a message m (a sequence of bits) into an original textual document x, called cover document, which is initially available in the electronic form. The document is mainly dedicated for the distribution and usage in its printed and watermarked version. The text can be represented by any shape and size font, with any orientation and appearance and in any language or symbols; all this essentially differs this invention from the mentioned state-of-the-art methods.

Watermark Generation

The watermark encoding is the following: the message m is encrypted using a user supplied encryption key $k_{enc}$ (FIG. 1, block 1); the resulting encrypted bit string is then encoded (2). This can include error correcting codes (ECC), resulting into the codeword c. Any ECC can be used, including (but not restricted to) Bose-Chaudhuri-Hochquenghem (BCH) codes, Reed-Solomon (RS) codes, low density parity check (LDPC) codes, Turbo codes, multilevel-code (MLC), or trellis coded modulation (TCM)—or even direct modulation with no ECC at all.

From a second auxiliary key $k_{aux}$, a reference pseudo-random sequence, called pilot sequence, is generated (3); this pilot, interleaved with the encoded message, helps for watermarking channel state estimation and synchronization at the watermark extraction stage. The codeword c and the pilot are spatially allocated (4), giving a watermark signal w. The signal w represents information encoded with symbols from an alphabet, which can be binary or of larger cardinality; w can have a multi-dimensional spatial allocation in general, but a one-dimensional sequence is the most convenient for text. The auxiliary key $k_{aux}$ may also be needed for the encoder (2) and for the watermark symbols spatial allocation within the sequence in (4). Typically, any existing oblivious watermarking algorithm can be used, meaning that the original document is not required for the decoding stage. This also assumes that Gel'fand-Pinsker random binning [40] can also be used in application to each host text character or symbol in order to embed w in text documents.

Electronic Document Watermarking

This subsection describes part of the novel contribution of the proposed scheme. The document x is available in a common electronic format, and could be for example: MS Word (.doc), Adobe Acrobat (.pdf), PostScript (.ps), LaTeX (.tex), Rich Text Format (.doc), or Web published texts (.html, .xml, . . . ), or equivalently any vector graphics format. A document parser (5), designed for the actual format, allows the separation of the different elements of a typical document (text, images, graphics, styles, etc.). The elements that can be marked $x_{text}$ are then selected (6), actually elements containing visible text or vector objects and which have been dedicated for watermarking in the context of the targeted application. The other elements $x_{non-text}$ are skipped, and are saved for further document recomposition, although they can be potentially watermarked as well using any other scheme. The selected components are then watermarked using the proposed technique (7). Finally, the watermarked selected textual or vector graphics elements and the other elements are all recombined together (8), with the same layout as for the original document. The result is a watermarked or stego document y, which can be either stored in electronic form as $\check{y}_a$ (9a), or printed (9b) yielding the hardcopy $\check{y}_b$.

Grayscale, Color or Halftone-Based Text Modulation

This subsection describes part of the novel contribution of the proposed scheme. The watermark w is used to modulate the selected textual elements in (7). For each textual element, characters are considered in a sequential manner, all character lines being appended in order to obtain a single one-dimensional line of characters. Some characters can be ignored by the modulation process, for example punctuation which can be difficult to segment at the decoding stage, or from which grayscale/color values or halftone patterns would be highly subject to errors, due to their small size; in the following we will call characters suitable for marking markable characters. The document can be also ordered in 2D form.

The gray level and/or color values of the selected characters are modified in an unperceived manner, in order to encode each successive symbol of the watermark w. Typically one watermark symbol per character can be embedded, thus modifying the global grayscale/color value or halftone pattern sequentially of each single character. However, if sufficiently large fonts are used, several (say 2, 4, or 6) watermark symbols can be embedded into each single character. In the case of grayscale/color modulation, any kind of values alteration can be used to encode symbols in text, for example: the absolute or relative levels of individual characters, level differences between successive characters, or any transform of a sequence of levels or group of two or more characters as a new codebook. To ensure oblivious watermark decoding, the communication with side information based on random binning, generally presented in Gel'fand-Pinsker work [40]—and summarized in following paragraph 35—can be incorporated into the subject of this proposal.

The used grayscale/colors values or halftone patterns should be chosen in such a way that: 1) to achieve the maximum mutual distances when estimated from the document in the decoding stage, for maximal decoding reliability; 2) to ensure at the same time imperceptibility for the human visual system (HVS), optimizing the mapping especially for printed documents; and 3) to achieve maximum robustness taking into account luminance transition effects in digital halftoning, reproduction or laser engraving, as well as scanning. Grayscale/color modulation is encoded using the specification instructions set available for most document formats: once document is watermarked, then open with the corresponding application (for example MS Word for .doc documents) and displayed or printed, the luminance and/or color of this watermarked document must be preserved; actually this is usually the case for the cited formats above. This aspect ensures fully electronic document management.

The sequence w can be embedded once and spread over the complete document, or repeatedly embedded (tasks of encoding and allocation shown as blocks 2 and 4 of FIG. 1). Generally speaking, w can be organized into one or several sub sequences, or any optimal arrangement with respect to the targeted application requirements. For example, when the end of w is attained, it can be read again from its $1^{st}$ symbol; the same can be done when the end of a text element is reached, the next symbol of w being embedded in the next text element. This results into the multiple embedding of the watermark if the number of markable characters is greater than the length of w. Moreover, the part of the text itself can be either losslessly compressed or a hash function or digital signature can be extracted from the whole document or from its parts and considered as the message m. This makes it possible to perform document authentication and local tamper proofing, as well as it enables self-extraction feature that allows to estimate the document as it was before modification.

Watermark Extraction from a Printed Watermarked Document

Figure 2:
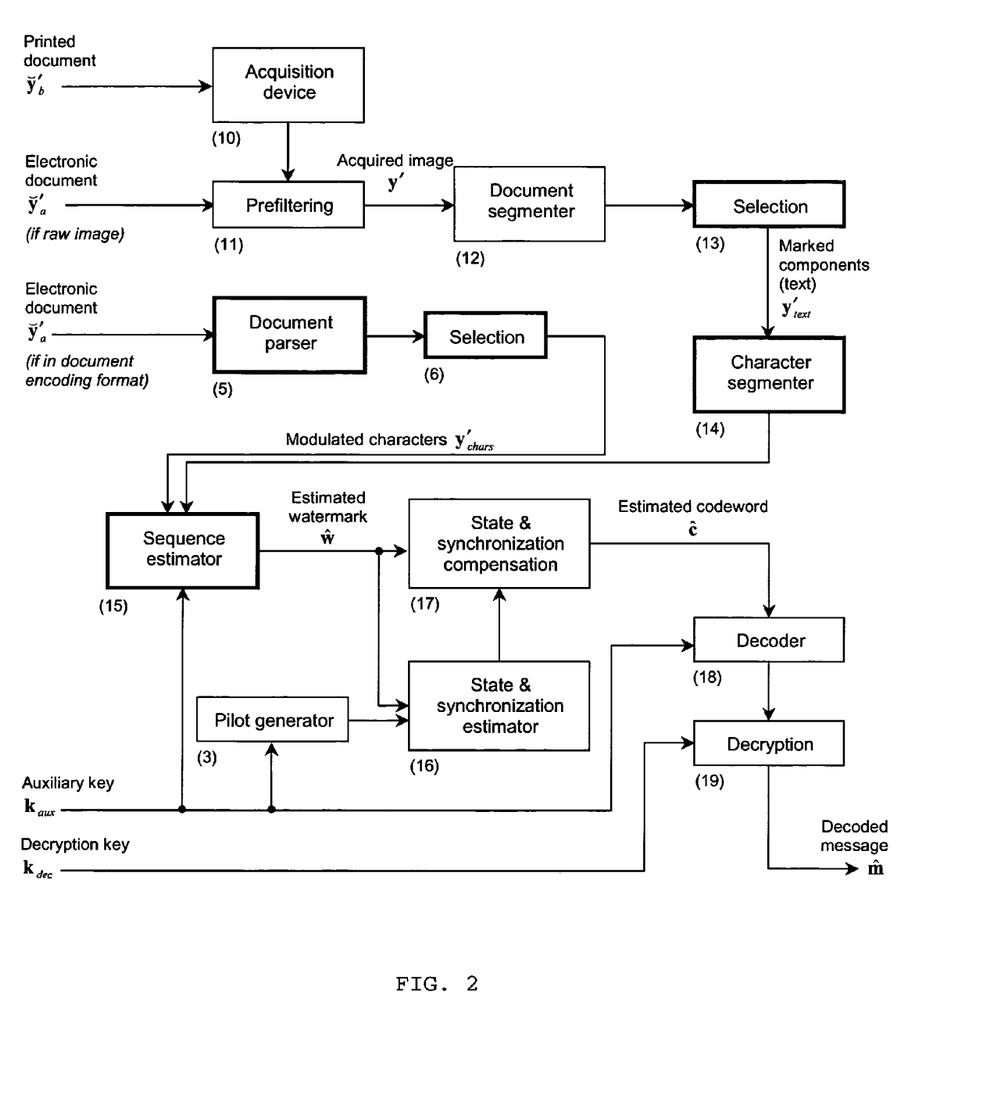
FIG. 2: An embodiment for the proposed algorithm addressing the watermark extraction and decoding from a watermarked and possibly distorted textual or vector graphics document, either in printed form $\check{y}_b$, or in electronic form $\check{y}_a$. The hardcopy document $\check{y}_b$ is acquired (10), prefiltering (11) is applied resulting into an electronic image y' of the document, followed by document segmentation (12) in order to isolate its different components. Textual (or vector graphics) components are then selected (13) as $y'_{text}$, and character (or vector graphics element) segmentation (14) is performed resulting into $y'_{chars}$. If the input document is available in electronic form $\check{y}_a$ if it is a row image, only the acquisition step is skipped and processing takes place from block (11); if it is in specific document encoding format, it is parsed and components and characters or vector graphics elements extracted as for the embedding stage (5), (6). Then from $y'_{chars}$ the watermark sequence is estimated (15) as w, by demodulating the sequence of single characters/vector graphics elements grayscale/color values or halftone patterns. Channel state and desynchronization are estimated (16) from w using the generated pilot (3) as reference, allowing watermark compensation (17), and resulting into the estimated codeword c. Then c is decoded (18), and then possibly decrypted (19) depending on the decryption key $k_{dec}$, giving the decoded message $\hat{m}$. The auxiliary key $k_{aux}$ (the same as in FIG. 1) may be needed for the sequence estimator (15), the pilot generator (3), and the decoder (18). The invention mainly consists of blocks in bold (13), (14) and (15), as well as (5) and (6) repeated from FIG. 1.

The watermark extraction process is illustrated in FIG. 2. The main contribution of this invention is shown by blocks in bold (13-15), and (5), (6) repeated from FIG. 1. Although the watermark can be easily detected from the electronic version of the stego document $\check{y}_a$ (if no distortion occurred), the proposed method mostly targets the watermarking of hard-copy documents as $\check{y}_b$.

Printed Document Acquisition

The printed stego and possibly attacked/distorted document $\check{y}'_b$ should therefore first be converted into an electronic image using an acquisition device (FIG. 2, 10), usually a scanner; the settings of this device should be set so as to maximize the differences between the different grayscale/color values or halftone patterns used to encode the watermark symbols (especially the scanning dynamic-range in the case of grayscale/color modulation). Any prefiltering and image enhancement can then be applied (11) in order to increase the accuracy of the following watermark detection, resulting into the raw image y'.

Document Segmentation

Afterwards document segmentation is performed (12) in order to extract the different elements from the scanned and prefiltered document y' (text, vector objects, raw graphics, etc.). For textual document, any efficient state-of-the-art document segmentation algorithm can be used. Geometrical transformations, such as document rotation on the scanner, can be compensated using existing techniques, for example a Hough transform-based method which finds the main direction of lines in the text. We propose to use a simple projection onto virtual axes assuming that normal text should be perfectly aligned. Additionally, rotated text has specific features in its Fourier magnitude that are also periodical due to the typical arrangement of text lines. Fourier transform or auto-correlation function of the document image are well-suited for this task.

Characters Segmentation

This subsection describes part of the novel contribution of the proposed scheme. Textual areas $y'_{text}$, which are supposed to contain the watermark, are then selected (13). From each watermarked textual area consecutive lines and then characters are segmented, resulting into a one-dimensional sequence of character images $y'_{chars}$ (14). Any segmentation technique can be used to isolate individual characters, like adaptive thresholding, contours tracking, morphological operations (binary or continuous), histograms, etc. The markable characters are selected, mostly based on their sizes and positions within the line. More generally one can perform so-called jointly typical decoding when one tries to match a given character with one from the codebook, when random binning based modulation was used. Similar techniques can be used for the vector graphics case.

Figure 3:
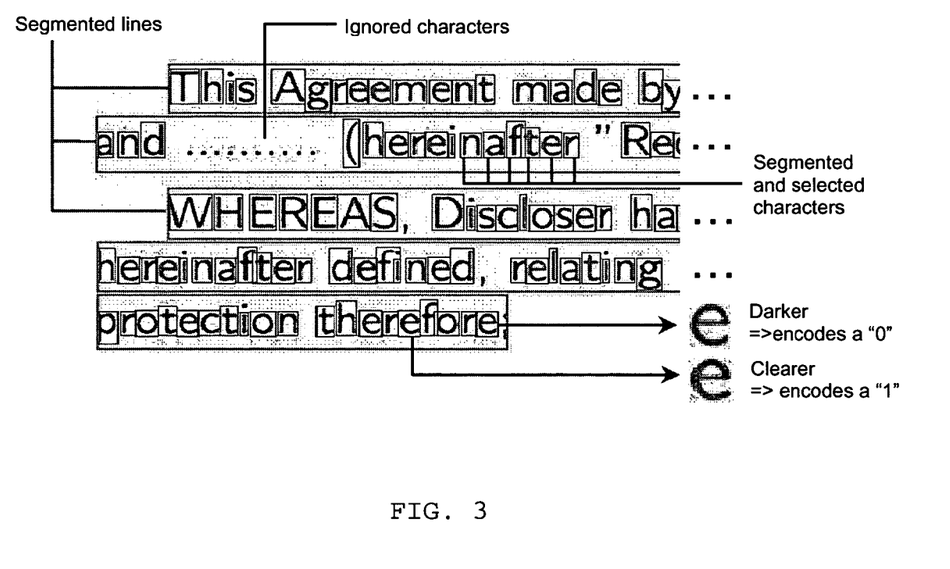
FIG. 3: An example of the characters segmentation performed in order to extract the embedded watermark from a scanned watermarked hard-copy textual document. The segmentation takes place line by line (rectangles around lines), then character by character (boxes around letters). Some characters can be ignored by the watermarking process, like here the dot " . . . ". In this example the global grayscale value of each character corresponds to one binary watermark symbol: a dark character encodes a "0", and a clearer one a "1".

FIG. 3 illustrates how lines, and then characters are segmented and selected. In this example, w is a binary one-dimensional watermark, and the text is grayscale modulated with one bit per character. Wide horizontal boxes surround detected lines, while smaller boxes bound the characters which have been selected for the extraction of grayscale values; non markable characters from which the estimation of grayscale would be difficult like punctuation signs are ignored. Here a clear character represents a "1" and a darker character a "0". It should be noticed that in digital form, the character grayscale/color value is represented by an internal format command, while in the printed form it is reproduced by the corresponding halftone pattern. Therefore, it is important to select the grayscale/color constellation in such a way that for a given printer and scanner resolution there is the necessary distances for a reliable classification of watermark symbols at the decoding stage.

Decoding from an Electronic Version

In the case when the input document is in electronic format as $\check{y}'_a$, two cases can be considered: if it is stored as a raw image, then the hard-copy acquisition step is just skipped and the prefiltering/segmentation processing above is applied; however if the input document is available in a document specific format such as MS Word (.doc), Adobe Acrobat (.pdf), PostScript (.ps), web format (.html, .xml), etc., then the same document parsing and text elements selection as for the watermark embedding stage—blocks (5) and (6) of FIG. 2, described in paragraph 19—should be performed in order to extract the characters or elements sequence with corresponding modulated features. Then, after this point, the remaining of the decoding stage follows.

Watermark Extraction and Demodulation

This subsection describes part of the novel contribution of the proposed scheme. A robust estimator is used to extract the average grayscale/color value from each segmented character, or to characterize the halftone pattern used (15)—step known as grayscale, color or halftone demodulation. This step can also be performed by using values of several adjacent characters, as mentioned above. All selected characters from successive lines and from successive textual elements then typically result into a single one-dimensional sequence of values for the whole document. Traditional optical character recognition (OCR) is not necessary, only segmentation and robust level estimation is needed; this especially if the document is written in standard and non-cursive font. Similar techniques are applied in the case of vector graphics. The estimation of the sequence may need the auxiliary key $k_{aux}$ in order to retrieve the spatial allocation of the sequence symbols.

Watermark Sequence Extraction and Message Decoding

Since characters segmentation may still suffer from errors (especially missed or miss-segmented characters or vector elements) resulting into wrong estimates and/or desynchronization, channel state and synchronization estimation is needed and is performed (16). Synchronization is evaluated based on the generated pilot (3) based on $k_{aux}$, typically by one-dimensional cross-correlation between the pilot and the estimated sequence $\hat{w}$, locally and/or globally. Then $\hat{w}$ is compensated (17) resulting into the estimated codeword c.

The estimated codeword ĉ is then decoded and inverse ECC applied (18). Soft-decision decoder and multi-stage decoder (MSD) are example of possible ECC decoders, depending on the number of watermark bits per character. The auxiliary key $k_{aux}$ may be needed for the decoder (18). The message is then finally decrypted (19) based on the decryption key $k_{dec}$, resulting into m̂.

CONCLUDING REMARKS

Concerning the Original Document Format

In the above set-up, the document parser used for the encoding stage is obviously document format-dependent, and this format should support character grayscale/color encoding; normally this is not a problem for usual text editing tools such as MS Word, LaTeX compiler, etc. However, in order to avoid the necessity to design a different parser for every existing format, two alternatives exist:

1) The most efficient approach consists in converting the document x into one generic format, for example Adobe Acrobat, HTML or XML, or PostScript format (such conversion is already achieved by common environments, at least for printing or Web publication purposes). Then only one parser needs to be designed for that generic format.
2) In a less efficient way, x can be converted into a row image with high resolution, using existing standard applications. Then the same document segmentation as for the extraction stage can be applied during the embedding on this high-resolution image, in order to extract and select text (or vector graphics) elements and individual characters or vector graphics elements. Then each markable character can be directly modulated in this image. However, as it was previously mentioned, this option produces documents of relatively large size and disables a possibility to introduce some new modification into the text. Thus, watermark embedding in text editing tool is more preferable.

Concerning Grayscale/Color Modulation

While our method modulates grayscale or color, most of printers actually print halftone patterns. Generally laser printers use clustered-dots halftoning (also called dithering), while ink-jet printer rely on error-diffusion; black ink is used for grayscale, and at least the four cyan, magenta, yellow and black inks are used for color printing. Therefore our scheme can rely on the two following techniques of modulation:

1) Either, the document is grayscale or color modulated, and the printer performs default halftoning to achieve these variations at sufficiently high resolution (e.g. 600 or 1200 dpi). The scanning is performed at rather low resolution (300-400 dpi), thus averaging the halftone patterns into grayscale/color levels close to the original ones. Consequently decoding takes place based on the cheap grayscale/color modulation approach as previously described.
2) Or, high resolution scanning and processing is available (e.g. 1200 or 2400 dpi), the halftone pattern can be retrieved from the scanned document. Then watermark embedding and detection can then be based on halftone patterns, the detection being made by cross-correlation with the used alphabet of halftone patterns (jointly typical decoding analog, with respect to the previously mentioned random binning). Several symbols can even be encoded while holding the same grayscale/color level. Further, simultaneous grayscale/color and pattern modulation can achieve an even larger watermark alphabet, thus increasing the data-hiding rate.

Concerning the Modulation and Random Binning

Figure 4:
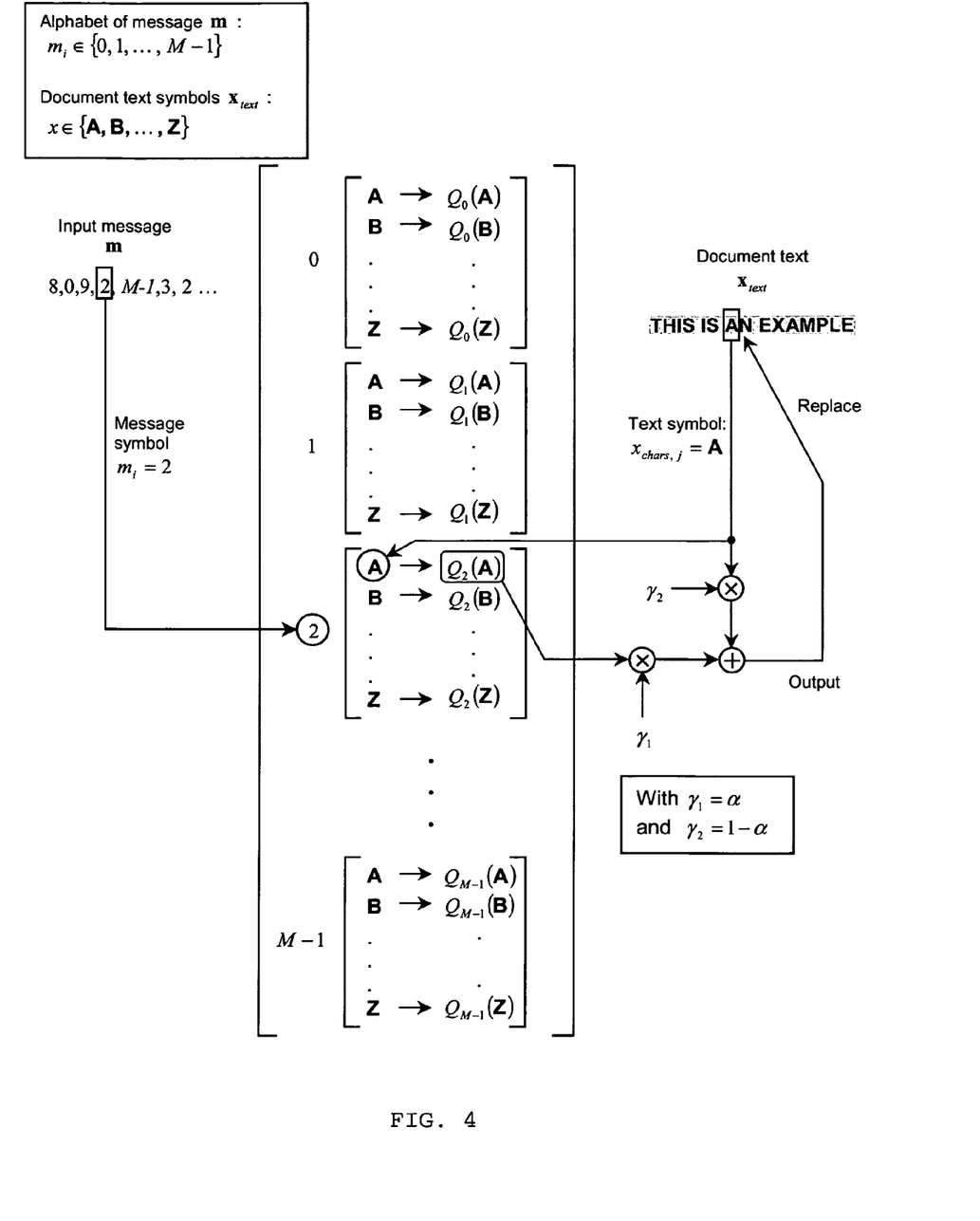
FIG. 4: Example of modulation based on practical implementation of theoretical Gel'fand-Pinsker random binning that can be applied to characters in the case of text documents. The transmitted signal depends on two variables: the message m with symbol $m_i \in \{0, 1, \ldots, M-1\}$, and the text $x_{text}$ with characters in a known alphabet, for example $x_{chars,j} \in \{A, B \ldots, Z\}$ including lower-case and upper-case, or alphanumeric and special symbols in more general case. The current message symbol $m_i=2$ corresponds to the bin #2, defining a modulation for each character; in this example, for the current character $x_{chars,j}=A$ we assign $Q_2(A)$ and modify the original character A correspondingly preserving its font, size and orientation. The parameters $\gamma_1$ and $\gamma_2$ (or $\alpha$) control the strength of the watermark (thus its visibility). $Q_i(.)$ represents some non-linear mapping function of text characters that can be either scalar, a vector quantizer, or any proper many-to-one mapper. The principle is applicable to grayscale or color values represented in any vector color space or halftone patterns modulation.

The modulation of grayscale/color values or halftone patterns can be based on the more general set-up of Gel'fand-Pinsker known as random binning [40], where some data can be encoded and sent through the same covert channel. Here the data to be sent consists of the message m, and of the covert channel of the text content in the case of text documents. The idea is to modulate the value of each character depending not only on the current message symbol, but also in function of the host text character; this principle is illustrated in FIG. 4. Let the message m contains symbols $m_i$ belonging to an alphabet $\{0, 1, \ldots, M-1\}$; let the host text $x_{text}$ made of characters $x_{text,j}$ from the alphabet $\{A, B, \ldots, Z\}$ (including upper/lower case, numbers, and special symbols). For the message symbol $m_i$ is chosen a codebook which depends on the current text character: here $m_i=2$ selects the bin #2, defining the necessary modification to the original character to carry out information about $m_i$. The pairs of corresponding values from the two variables (like $(m_i; Q_{m_i}(x_{chars,j}))$) are called jointly typical pairs.

Concerning Keys, and Symmetrical vs. Asymmetrical Protocols

The encryption key $k_{enc}$ and decryption key $k_{dec}$ can be either a cryptographic secret key ($k_{enc}=k_{dec}$ kept secret), or a private/public key pair ($k_{enc} \neq k_{dec}$, one being published and the other one kept private) in an asymmetrical protocol. The auxiliary key $k_{aux}$ is needed to generate the pilot sequence, and possibly the encoding algorithm and the spatial allocation of watermark symbols, therefore it is required at both the embedding and extraction stages. Consequently, in an asymmetrical scenario $k_{aux}$ can also require publishing. One typical example is the asymmetrical protection of documents, based on the embedding of authentication information derived from the document itself (digital signature and/or main items from the document content itself); in this case, only a certified authority can encrypt/sign and produce valid documents with its private key $k_{enc}$, while everyone can authenticate these documents using the public key $k_{dec}$.

Concerning the Use of Optical Character Recognition

The proposed watermarking scheme described above relies only on document and character or vector graphics segmentation, but does not need by itself neither character recognition nor semantic interpretation in the case of text documents. Of course the accuracy of character segmentation could be enhanced by optical character recognition (OCR), but this is an optional feature. The pilot sequence and/or the structure of the luminance/color modulation can be exploited instead in order to enhance the accuracy of character segmentation.

Oppositely, OCR can be used in the context of a security protocol, in particular for document authentication: in this application the text is recognized from the printed document by the OCR, and then compared with the authentication data decoded from the watermark, thus validating the document. Moreover, the embedded watermark can increase the accuracy of a jointly used OCR helping in separating characters, by using differences of grayscale/color values or of halftone patterns.

Concerning Targeted Applications

Depending of the targeting applications several following extensions are predicted:
1) The watermark sensitivity to copying: the watermark can be adjusted in such a way that it can be preserved or contrarily removed under unauthorized operations such as document copying, local alteration, document digitalisation using optical character recognition (OCR) tool.
2) The technology described above can be simultaneously used with classical optically visible inks that include all printing technologies (inkjet, laser, dot matrix printers, printers with ribbon possibly containing inks with special properties, lithography, etc.) or invisible inks that cover both infrared and ultraviolet wavelength ranges. The document can be printed by infrared or ultraviolet inks excited in the corresponding bands and can be read in any bands (optical, infrared, ultraviolet) depending on the security demands of the system exploitation. At the same time the document can be printed by the optically visible inks with special luminance and kinetic properties that include different color and decay times of the luminance processes.
3) The watermarked text, according to the described technology, can be engraved on ceramic, plastic, glass or any material using corresponding techniques such as laser or microscope marking technologies.
4) The embedded data can contain information about the document ownership and its identification number, the computer name and IP-address, login access and network properties once logged in, the personal data of the author, including biometrical data (iris, fingerprint, photograph, voice sample), the date, time and place where the document was issued, the destination, etc. In the case of anti-counterfeiting, the text on the label, plastic, glass, special paper, aluminium or other foils can contain all necessary information for identification of product authenticity, and corresponding data for its tracing and tracking. The embedded data will enable unique document authentication, identification, tamper proofing (detection of local modifications), document tracking, access control, or any assisting functionalities previewed (foreseen) or developed in future in the area multimedia document management and security.

Concerning the Physical Support

The subject of current technology description concerns ordinary (cellulose) paper as well as special papers including the papers with ruffled surface, plastic, or any other support on which text or vector graphics can be reproduced.

REFERENCES

[1]. A. M. Eskicioglu and E. J. Delp, "An overview of multimedia content protection in consumer electronic devices", Signal Processing: Image Communication, vol. 16, pp. 681-699, 2001.

[2]. M. Kutter, Watermarking resistent to translation, rotation and scaling, in Proc. SPIE Int. Symp. on voice, Video, and Data Communication, November 1998.

[3]. C. I. Podilchuk and E. J. Delp, "Digital watermarking: Algorithms and applications", IEEE Signal Processing Magazine, vol. 18, no. 4, pp. 33-46, July 2001.

[4]. J. J. K. Ó Ruanaidh and T. Pun, "Rotation, Scale and Translation Invariant Spread Spectrum Digital Image Watermarking", Signal Processing, vol. 66 num. 3, pp. 303-317, 1998.

[5]. R. W. Wolfgang, C. I, Podilchuk and E. J, Delp, "Perceptual watermarks for digital images and video", Proceedings of the IEEE, vol. 87, no. 7, pp. 1108-1126, July 1999.

[6]. D. Coppersmith, F. Mintzer, C. Tresser, C. W. Wu and M. M. Yeung, "Fragile imperceptible digital watermark with privacy control", IS&T/SPIE Electronic Imaging '99, Session: Security and Watermarking of Multimedia Contents", January 1999, San Jose, Calif., USA.

[7]. J. Fridrich, "A Hybrid Watermark for Tamper Detection in Digital Images", Proceedings of ISSPA 1999 Conference, pp. 301-304, August 1999, Brisbane, Australia.

[8]. P. W. Wong, "A Public Key Watermark for Image Verification and Authentication", Proceedings of the IEEE International Conference on Image Processing (ICIP) 1998, vol. 1, MA11.07, October 1998, Chicago, Ill., USA.

[9]. M. Wu and B. Liu, "Watermarking for image authentication", Proceedings of IEEE International Conference on Image Processing (ICIP) 1998, TA10.11, Focus Interactive Technology Inc., October 1998, Chicago, Ill., USA.

[10]. Z. Z. Baharav and D. Shaked, "Watermarking of dither halftoned images", Proceedings of the IS&T/SPIE International Conference on Security and Watermarking of Multimedia Content I, vol. 3657, pp. 307-316, January 1999, San Jose, Calif., USA.

[11]. M. S. Fu and O. C. Au, "Data hiding watermarking for halftone images", IEEE Transactions on Image Processing, vol. 11, no. 4, pp. 477-484, April 2002.

[12]. S. Voloshynovskiy, F. Deguillaume and T. Pun, "Content adaptive watermarking based on a stochastic multiresolution image modeling", Proceedings of the Tenth European Signal Processing Conference (EUSIPCO) 2000, September 2000, Tampere, Finland.

[13]. F. Deguillaume, S. Voloshynovskiy and T. Pun, "Method for the estimation and recovering of general affine transforms in digital watermarking applications", Proceedings of the IS&T/SPIE International Conference on Security and Watermarking of Multimedia Content IV, vol. 4675, pp. 313-322, April 2002.

[14]. S. Voloshynovskiy, F. Deguillaume and T. Pun, "Multibit Digital Watermarking Robust Against Local Nonlinear Geometrical Distortions", Proceedings of the IEEE International Conference on Image Processing, pp. 999-1002, October 2001, Thessaloniki, Greece.

[15]. F. Deguillaume, S. Voloshynovskiy and T. Pun, "Secure Hybrid Robust Watermarking Resistant against Tampering and Copy Attack" IEEE Signal Processing, vol. 83, no. 10, pp. 2133-2170, October 2003.

[16]. F. Deguillaume, S. Voloshynovskiy and T. Pun, "Method for the estimation and recovering of general affine transform", Patent U.S. 2003/0133589, application U.S. Ser. No. 10/051,808 filed Jan. 17, 2002, published Jul. 17, 2003.

[17]. F. Deguillaume, S. Voloshynovskiy and T. Pun, "Secure hybrid robust watermarking resistant against tampering and copy-attack", Patent U.S. 2003/0070075, application U.S. Ser. No. 10/194,278 filed Jul. 15, 2002, published Apr. 10, 2003.

[18]. S. Voloshynovskiy, F. Deguillaume and T. Pun, "Digital watermarking method robust against local and global geometrical distortions and projective transforms", Patent WO 03/032254, applications U.S. 60/327,097 filed Oct. 4, 2001, PCT/IB02/04054 filed Oct. 2, 2002, published Apr. 17, 2003.

[19]. A. K. Bhattacharjya and H. Ancin, "Data embedding in text for copier systems", IEEE International Conference on Image Processing (ICIP), October 1999, Kobe, Japan.

[20]. A. K. Bhattacharjya and H. Ancin, "Information embedding in document copies", patent U.S. Ser. No. 09/136,161, filed Aug. 18, 1998, published Sep. 24, 2002.

[21]. G. B. Rhoads, "Security system for photographic identification", U.S. Pat. No. 763,847, filed Dec. 4, 1996, published Nov. 24, 1998.

[22]. F. Koltai, L. Baros, B. Ádám and F. Takács, "Anticounterfeiting method and apparatus using digital screening", patent application U.S. Ser. No. 09/005,529, filed Jan. 12, 1998, published Aug. 15, 2000.

[23]. A. M. Alattar and O. M. Alattar, "Watermarking electronic text documents containing margin justified paragraph and irregular line spacing", Proceedings of the IS&T/SPIE International Conference on Security, Steganography, and Watermarking of Multimedia Contents VI, vol. 5306, pp. 685-695, January 2004, San Jose, Calif., USA.

[24]. J. T. Brassil, S. Low and N. F. Maxemchuk, "Copyright protection for electronic distribution of text documents", Proceedings of the IEEE, vol. 87, no. 7, pp. 1181-1196, July 1999.

[25]. J. T. Brassil, S. H. Low, F. Maxemchuk and L. P. O'Gorman, "Document copying deterrent method", Patent U.S. 006086706, application U.S. Ser. No. 08/170,619 filed Dec. 20, 1993, published Jul. 11, 2000.

[26]. J. T. Brassil, S. H. Low, F. Maxemchuk and L. P. O'Gorman, "Document copying deterrent method using line and word shift techniques", Patent U.S. 005629770, application U.S. Pat. No. 414,857 filed Mar. 31, 1995, published May 13, 1997.

[27]. J. T. Brassil, S. Low, N. F. Maxemchuk and L. O'Gorman, "Electronic marking and identification techniques to discourage document copying", IEEE Journal on Selected Areas in Communication, vol. 13, no. 8, pp. 1495-1504, October 1995.

[28]. S. Low and N. F. Maxemchuk, "Capacity of text marking channel", IEEE Signal Processing Letters, vol. 7, no. 12, pp. 345-347, December 2000.

[29]. M. J. Mahon, J. C. Huck and D. C. Morris, "Method and apparatus for embedding identification codes in printed documents", Patent EP 0629972, applications U.S. Pat. No. 52,253 filed Apr. 23, 1993, EP 94301256.7 filed Feb. 22, 1994, published Dec. 21, 1994.

[30]. J. Pasqua, "Document watermarking method using line margin shifting", Patent U.S. 2002/0118860, application U.S. 60/270,595 filed Feb. 23, 2001, published Aug. 29, 2002.

[31]. D. Huang and H. Yan, "Interword distance changes represented by sine waves for watermarking text images", IEEE Transactions on Circuits and Systems for Video Technology, vol. 11, no. 12, pp. 1237-1245, December 2001.

[32]. Y.-W. Kim, K.-A. Moon and I.-S. Oh, "A Text Watermarking Algorithm based on Word Classification and Inter-word, Space Statistics", Seventh International Conference on Document Analysis and Recognition, vol. II, pp. 775-779, August 2003, Edinburgh, Scotland.

[33]. M. Atallah, V. Raskin, C. F. Hempelmann, M. Karahan, R. Sion, U. Topkara, K. E. Triezenberg, "Natural Language Watermarking and Tamperproofing", Fifth Information Hiding Workshop (IHW 2002), LNCS 2578, Springer Verlag, October 2002, Noordwijkerhout, The Netherlands.

[34]. F. Carro, "Method of invisibly embedding and hiding data into soft-copy text documents", Patent WO 02/102055, application EP 01480048.6 filed Jun. 12, 2001, published Dec. 19, 2002.

[35]. A. Manikas and L. F. Turner, "Electronic watermarking", Patent number WO 00/04501, application PCT/GB99/02265, Jul. 14, 1998.

[36]. Y. Hirayama, T. Amano, S. Shimizu and N. Morimoto, "Embedding watermark information in an electronic document", Patent GB 2344666, application JP 10252623 filed Sep. 17, 1998, GB 9921762.2 filed Sep. 16, 1999, published Aug. 24, 2004.

[37]. A. K. Mikkilineni, G. N. Ali, P.-J. Chiang, G. T. C. Chiu, J. P. Allebach and E. J. Delp, "Signature-embedding in printed documents for security and forensic applications", Proceedings of the IS&T/SPIE International Conference on Security, Steganography, and Watermarking of Multimedia Contents VI, vol. 5306, pp. 455-466, January 2004, San Jose, Calif., USA.

[38]. Y. Liu, J. Manton, E. Wong and S. Low, "Marking and detection of text documents using transform-domain techniques", Proceedings of IS&T/SPIE Conference on Security and Watermarking of Multimedia Contents, vol. 3657, pp. 317-328, January 1999, San Jose, Calif., USA.

[39]. F. Jordan, R. Meylan and M. Kutter, "Method for preventing counterfeiting or alteration of a printed or engraved surface", Patent U.S. 2004/0013285, applications U.S. Ser. No. 10/380,914 priority CH 1832/00 filed Sep. 20, 2000, PCT/CH01/00560 filed Sep. 17, 2001, published Jan. 22, 2004.

[40]. S. I. Gel'fand and M. S. Pinsker, "Coding for channel with random parameters", Problems of Control and Information Theory, vol. 9, no. 1, pp. 19-31, 1980.

We claim:

1. A method for embedding a digital watermark w into textual and/or vector graphics documents of electronic and/or hard-copy form, based on the modulation of luminance or grayscale values, of color values, and/or of halftone patterns of characters and/or of vector elements, the method comprising the steps of (a) encoding a digital message m, resulting into a codeword c; spatially allocating the codeword c, resulting into a watermark signal w suitable for text and/or vector graphics modulation, (b) parsing the original input document in electronic format x in order to isolate all its components, (c) selecting text and/or vector graphics components $x_{text}$ which will carry the watermark w and parsing components $x_{text}$ in order to select single entities or elements to use to encode individual w symbols; and keeping the remaining non selected components $x_{non-text}$ for later document recomposition, (d) modulating the grayscale attributes, the color attributes and/or the halftone pattern attributes of the selected elements in the selected text and/or vector graphics components $x_{text}$, (e) recomposing the document from the marked version of selected components $x_{text}$ and the remaining components $x_{non-text}$, resulting into a watermarked document y, which can be stored, distributed, and/or used in electronic form as electronic document $\check{y}_a$ or in printed form as hard copy document $\check{y}_b$.

2. The method of claim 1 wherein step (a) comprises encrypting the digital message m depending on an encryption key $k_{enc}$, and/or encoding the message depending on an auxiliary key $k_{aux}$, and/or spatially allocating the codeword c depending on $k_{aux}$ and/or with interleaving of a pilot sequence also depending on $k_{aux}$; wherein the method uses any encryption and/or any encoding to generate the codeword c; wherein it uses any spatial allocation to generate the watermark signal w, using symbols from any alphabet either binary or of higher cardinality; wherein it uses any error correcting coding (ECC) comprising each member of the group formed of Bose-Chaudhuri-Hochquenghem (BCH) codes, Reed-Solomon (RS) codes, low density parity check (LDPC) codes, Turbo codes, multilevel-code (MLC), or trellis coded modulation (TCM), or even direct encoding without encryption and/or without ECC; wherein it uses any framework of communication with side information.

3. The method of claim 1 wherein said input document may contain any mixture of embedded objects comprising each member or its combination of the group formed of text, vector, graphics, raw or bitmap images, attributes, or any other type of object, while only text objects comprising alphanumeric symbols of any font and size in any language or vector graphics components $x_{text}$ are selected for watermark modulation; and wherein any other watermarking scheme or any other processing may be applied in parallel to any other document component.

4. The method of claim 1 wherein said selected components for watermarking are text components and/or vector graphics components; wherein elements suitable for modulation are single characters, parts or zones of single characters, groups of characters, vector graphics elements and/or known parts/zones of them; wherein elements used for marking are selected based on any criteria in prevision of future accurate detection.

5. The method of claim 1 wherein step (d) performs the modulation of one or several features among grayscale values, color values and halftone patterns, within a complete character/symbol or only some of its parts, according to the following scheme:

(a) grayscale modulation for documents printed in grayscale or color, at low, medium or high printing and/or acquisition resolution when the user defines the selected reproduction principle, (b) color modulation documents printed in color, at low, medium or high printing and/or acquisition resolution, (c) halftone patterns modulation for sufficiently low-resolution printing and sufficiently high-resolution acquisition, (d) 1, 2 or 3 attributes among grayscale, color and halftone modulation being adapted to be used jointly, either to embed a single watermark, or to embed several independent watermarks simultaneously.

6. The method of claim 1 wherein perceptual masking is applied while modulating said attributes, achieving the imperceptibility of the presence of a watermark with respect to the human visual system in the electronic document $\check{y}_a$ and/or in the hard-copy document $\check{y}_b$, of the said watermarked document y.

7. The method of claim 1 wherein said electronic input document x is of any format, the format of textual documents including each member of the group formed of Microsoft Word (.doc), Adobe Acrobat (.pdf), Adobe PostScript (.ps), LaTeX (.tex), Rich Text Format (.doc), Web published texts (.html, .xml), or any future format; wherein for textual documents using separate formatting or style sheets (.html/.css, .xml/.xslt), the watermark is adapted to be embedded either in the document itself or in its corresponding formatting/style sheet.

8. The method of claim 1 wherein said electronic input document x is adapted to be converted into one "generic" format in order to design a watermark embedder for that format only, wherein that generic format includes each member of the group formed of LaTeX (.tex), PostScript (.ps), or Acrobat (.pdf).

9. The method of claim 1 wherein said electronic input document x is converted into a format which is adapted to handle the grayscale attributes, color attributes, and/or halftone pattern attributes or wherein the watermark w is stored and modulation is applied later up to the printing stage by (a) converting the electronic input document x into a generic format including each member of the group formed of LaTeX (.tex), PostScript (.ps), and Acrobat (.pdf) which allows to handle those attributes, or by (b) storing the watermark, either in a header within the document format or separately, and then performing the watermark embedding before or during the printing process.

10. The method of claim 1 wherein printing said hard copy document $\check{y}_b$ is performed by any suitable printing technology including each member of the group formed of laser or ink-jet printers, offset printing, dye sublimation, thermal printing, laser engraving, electro-photographic techniques, continuous-tone printing, or any other technology.

11. A method for extracting a digital watermark $\hat{w}$ from textual and/or vector graphics documents of electronic and/or hard-copy form based on the modulation of luminance or grayscale values, of color values, or of halftone patterns of characters or of vector elements, wherein the watermarked and potentially distorted or attacked document $\check{y}'$ is segmented, processed and the watermark extracted as $\hat{w}$, the codeword $\hat{c}$ estimated, and the message $\hat{m}$ decoded, the method comprising the steps of (a) applying document segmentation to the watermarked document $\check{y}'$, including the selection of documents text and/or vector graphics components $y_{text}$, (b) extracting the potentially modulated elements from the text and/or vector graphics components, including performing character and/or elements segmentation for text and/or vector graphics documents, (c) estimating the watermark signal $\hat{w}$ from the modulated grayscale, color and/or halftone pattern attributes, (d) generating a pilot signal; estimating and compensating the extracted watermark $\hat{w}$ state and desynchronization, based on the pilot signal, resulting into the estimated codeword $\hat{c}$; decoding the codeword $\hat{c}$ resulting into the final message $\hat{m}$.

12. The method of claim 11 wherein, if the watermarked and potentially distorted or attacked document is available in electronic form $\check{y}'_a$, the method comprises, (a) if the electronic document $\breve{y}'_a$ is available as a raw image y', first, the step of prefiltering said raw image y' for better processing accuracy for the following steps in order to decode the message $\hat{m}$, (b) if the electronic document $\breve{y}'_a$ is available as specific document encoding format, including each member of the group formed of Microsoft Word (.doc), Adobe Acrobat (.pdf), Adobe PostScript (.ps), LaTeX (.tex), Rich Text Format (.doc), Web published texts (.html, .xml, etc.), or any vector graphics formats, that said steps (a) and (b) include parsing the input document $\breve{y}'_a$ in order to isolate all its components and selecting text and/or vector graphics components $y_{text}$ potentially carrying the watermark w and parsing components $y_{text}$ in order to select single entities or elements potentially used to encode individual w symbols, while said steps (c) and (d) comprise grayscale, color values, and/or halftone patterns extraction from these components in order to decode the message $\hat{m}$.

13. The method of claim 11 wherein, if the watermarked and potentially distorted or attacked document is available only in hard-copy form $\breve{y}'_b$, the method further comprises, first, the step of acquiring the printed document $\breve{y}'_b$ resulting into the document raw image y', and/or the step of prefiltering this image y' for better processing accuracy for the following steps; wherein it uses any acquisition device to acquire the hard-copy document including each member of the group formed of a flat-bedded or hand-held scanner, a camera, the camera of a mobile phone, or any other imaging acquisition device.

14. The method of claim 11 wherein the steps of estimating the watermark signal $\hat{w}$ from the modulated grayscale, color and/or halftone pattern attributes, and/or of generating a pilot signal, and/or of estimating and compensating the extracted watermark $\hat{w}$ state and desynchronization, and/or decoding the codeword $\hat{c}$ depend on an auxiliary key $k_{aux}$, and/or wherein the method comprises the step of decrypting the codeword $\hat{c}$ into the final message $\hat{m}$, the decryption being independent or dependent on a decryption key $k_{dec}$.

15. The method of claim 11 wherein steps (a), (b) select components and elements in a logically reproducible spatial organization, said spatial organization being chosen, in the case of text documents, from the group comprising the logical sequence of pages, paragraphs, lines, words and characters.

16. The method of claim 11 wherein any watermark signal detection, estimation, channel state estimation and compensation, desynchronization estimation and compensation technique is applied to the extracted watermark $\hat{w}$ in order to obtain the estimated codeword $\hat{c}$; wherein any decoding can be applied to the codeword $\hat{c}$ to decode the message $\hat{m}$, including any ECC decoding; wherein optionally an auxiliary $k_{aux}$ is applied for watermark extraction and decoding.

17. The method of claim 12 or 13 wherein the step of prefiltering said raw image y' uses any image prefiltering method, including each member of the group formed of low-pass/high-pass spatial frequency filtering, contour detection, enhancement, noise reduction.

18. The method of claim 11 wherein step (a) is applied on any raw-image document in order to isolate the document components, the document segmentation consisting in textual document segmentation for text documents, or vector elements segmentation based on shape and/or disposition criterions for vector graphics documents.

19. The method of claim 11 wherein step (b) uses any elements segmentation technique, including each member of the group formed of contour extraction, morphological operators, or shape analysis.

20. The method of claim 1 or claim 11 wherein possible hard-copy supports include standard or special high-quality paper, cellulose, ruffled surface, plastic, smart-cards, glass, cartoon, metallic, ceramics, or any other physical support.

21. The use of the method of claim 1 or 11 for security or non-security applications, which are including each member of the group formed of (a) copy protection, ownership or rights protection, authentication, integrity control, (b) personal identification, joint security document authentication and tamper proofing, (c) content tracking, content tracing, content self-annotation, content post-processing attributes encoding, quality of service control, or enhancement of optical character recognition (OCR), (d) delivery and distribution of secure documents through public distribution channels including postal or public networks.

22. The use of the method of claim 1 or 11 in combination with many kinds of documents including each member of the group formed of (a) authentication documents, passports, visas, identity cards, driving licenses, (b) payment documents or tokens, credit cards, banknotes, currency tickets, stock certificates, bank checks, travelers checks (c) anti-counterfeiting labels or packaging, tax stamps, postage stamps, (d) travel documents, train tickets, airplane tickets, (e) certificates, diplomas, attestations, financial transactions, shares certificates, birth certificates, medical documents, prescriptions, (f) contracts, agreements, (g) technical or industrial reports, (h) medical insurance documents.

23. The method of claim 1 or 11 wherein the embedded watermark information:

(a) is document semantic content dependent, document feature dependent, including either printed information features, or physical, or support features document/support independent; or can use any combination of these options, and/or (b) uses any protocol depending on the addressed application, including symmetric or asymmetric cryptographic protocol when encryption is used, and where any of keys among $k_{enc}$, $k_{dec}$ and $k_{aux}$ are either public or private, either all public, or all secret.

* * * * *

UNITED STATES PATENT AND TRADEMARK OFFICE
CERTIFICATE OF CORRECTION

PATENT NO. : 7,644,281 B2 Page 1 of 1
APPLICATION NO. : 10/949318
DATED : January 5, 2010
INVENTOR(S) : Deguillaume et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1430 days.

Signed and Sealed this

Sixteenth Day of November, 2010

David J. Kappos
*Director of the United States Patent and Trademark Office*